INVENTOR
BENJAMIN M. HACKERT

INVENTOR
BENJAMIN M. HACKERT

United States Patent Office 3,091,811
Patented June 4, 1963

3,091,811
APPARATUS AND METHODS FOR MOLDING A FOAMING MATERIAL
Benjamin M. Hackert, Hillegom, Netherlands, assignor to N.V. Hollandsche Draad-En Kabelfabriek, Amsterdam, Netherlands, a limited-liability company of the Netherlands
Filed Nov. 24, 1958, Ser. No. 775,945
4 Claims. (Cl. 18—39)

The invention relates to apparatus and methods for filling a hollow moulding space with a material which foams during filling to a porous mass. In this specification the term "porous mass" comprises both material having open cells and material having closed cells.

With known methods, attempts have been made to maintain the upper surface of a foaming material nearly flat by moving the substantially vertical limits of the hollow molding space upwardly. However, the said known methods have the disadvantage that the actuating force for moving the limits of the hollow molding space upwardly is delivered by the foaming material itself. As with the said movement friction between the foaming mass and the limits of the said hollow molding space is appreciable, the consequence thereof is that the height of the lateral faces of the finally molded material is still considerably lower than the mean height of the porous mass. This gives rise to the occurrence of considerable material losses when providing the molded body with finished flat faces.

The invention has for an object the elimination of the said disadvantage and at the same time the providing of a suitable method of continuously manufacturing objects of porous material by foaming.

The present invention provides a method of filling a hollow molding space with a material which foams during filling to a form a porous mass. The method conprises supplying the said material continuously in a substantially horizontally moving trough. The lateral limits of the trough are moved at the place where the free foaming of the said material occurs in a substantially vertical plane so, that the horizontal component of said movement has a speed which corresponds substantially with the horizontal speed at which the foaming mass is conveyed, the vertical component of said movement having a speed which is equal to or greater than the vertical speed at which the surface of the foaming mass rises.

It has appeared that it is not absolutely necessary that the whole substantially vertical surface which the foaming mass contacts is also moved upwardly. In order to obtain a flat upper surface of the foam-shaped mass it is sufficient that only the portion of the vertical limit where the meniscus of the foaming mass is present is moved upwardly.

It is a further object of the invention to provide a device adapted to carry the method according to the invention into effect and in accordance with the invention the said device comprises a horizontal conveying trough adapted to be advanced longitudinally, and guiding members adapted to be positively driven and arranged in the said trough nearly at the place where foaming begins, close to and parallel to both inner sidewalls of the said trough, said guiding members being disposed to guide the foaming mass in such a direction that their movement has a component both in the horizontal direction of conveyance of the trough and in the vertical rising direction.

It is another object of the invention to provide a device for carrying the method of the invention into effect, said device comprising a horizontal conveying trough adapted to be advanced longitudinally, guiding plates stationarily positioned in the said trough in the region where foaming occurs, close to and parallel to both inner sidewalls of the said trough, and of flexible material folded around said guiding plates and adapted to be positively driven, said guiding plates being shaped at the place where foaming begins in such a manner that the strips of flexible material are moved, after advancement in horizontal direction through a sharp angle to the said direction, such that the movement of said strips has a component both in the horizontal direction of conveyance of the trough and in the vertical rising direction.

Still another object of the invention is to provide a device for carrying the method according to the invention into effect, said device comprising a horizontal conveying trough adapted to be advanced longitudinally. Rotatable discs are positioned in the said trough nearly at the place where foaming begins, close to and parallel to both inner sidewalls of the said trough, said discs being adapted to be positively driven and to be rotated in such a direction that the foaming mass is moved both in horizontal direction and upwardly.

The foaming may commence at the place where the material is carried into the advancing molding space, or there may be some lapse of time before the foaming begins. In the last case the material is displaced through a certain distance substantially in horizontal direction before foaming begins.

The invention will be further elucidated with reference to the drawing which shows two embodiments for carrying into effect the method according to the invention.

FIGURE 1b shows the foaming mass in the embodiment of FIG. 1a;

FIGURE 2b shows the foaming mass in the embodiment of FIG. 2a.

Figure 1A:
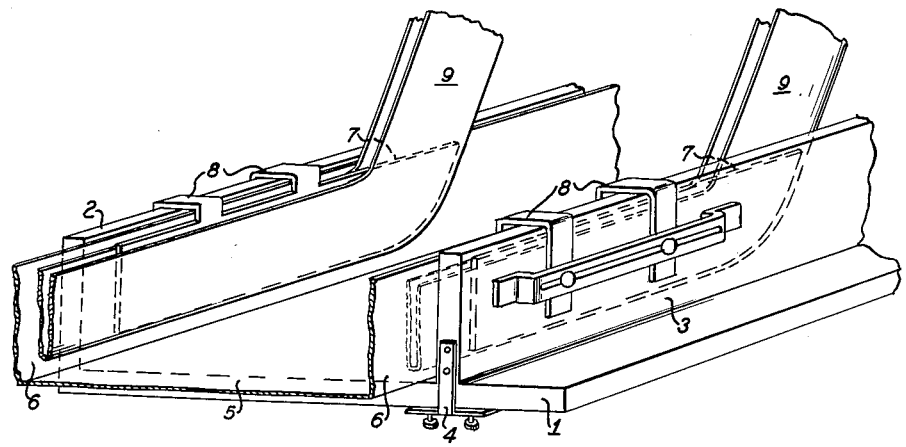
FIGURE 1a is a perspective view of a first embodiment according to the invention.
Figure 1B:
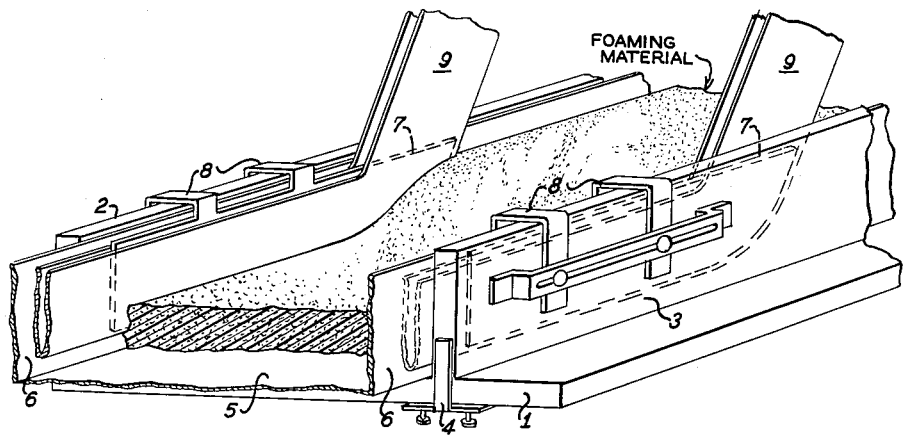

The device illustrated in FIGURES 1a and 1b consists of a stationary molding box having a bottom 1, a stationary sidewall 2 and a sidewall 3 adapted to be displaced in parallel relation to the first mentioned sidewall, the sidewall 3 may be fixed, after adjusting the same to the correct width of the material to be molded by means of a clamping device 4.

In the said stationary molding box there is a strip of a flexible material 5 such as paper or similar material, folded in the shape of a trough. The said strip constitutes the limit of the molding space which comes into contact with the material to be molded. During the operation it is advanced through the box 1–3 in the direction indicated by the arrow.

On the inner side of the vertical sidewalls 6 of the said advancing trough, two guiding plates 7 are disposed close to the said walls, the said plates having nearly the shape of a skates and consisting, e.g., of sheet iron. Each guiding plate 7 is fixed to one of the sidewalls 2 and 3 by means of brackets 8, so that the said guiding plates take a stationary position in space. The guiding plates 7 which are with their upper rim nearly flush with the upper rim of the sidewalls 2 and 3 have a smaller height than the said sidewalls and they extend through a distance of about four times their height parallel to the bottom of the conveying trough 5, 6. At the place where foaming in the said conveying trough begins to occur, the bases of the said guiding plates constitute a sharp angle with the bottom of the conveying trough.

Furthermore a strip of flexible material 9, consisting, for example, of crêpe paper, is folded about each of both guiding plates 7, in such a manner that both side rims of that strip are adjacent both sides of the upper rim of the guiding plate in question. The guiding plates serve to guide the strips 9 which are moved together with the conveying trough 5, 6 in the directions indicated by the arrow. The speed at which the said strips are guided along the said guiding plates 7 may be controlled separately through the distance where the lower rims of the guiding plates 7 are parallel to the bottom of the moving conveying trough 5, 6 the speed at which the strips of crêpe paper 9 are advanced is nearly equal to that at which the mass, which is still in the liquid state, advances in the conveying trough. At the place where the said mass begins to foam, thus also at the place where the lower rims of the guiding plates 7 begin to run upwardly in an oblique position, the strips of crêpe paper 9 are guided by the rising lower rims of the said guiding plates, and are thereby raised at the location where the surface of the foaming material is foaming. In FIGURE 1b the material conveyed in the conveying trough 5, 6 is shown. The guiding plates 7 end at the place where the foaming mass has nearly reached its full height; i.e. rather close below the upper rim of the vertical sidewalls 6 of the conveying trough 5, 6. At this place the strips of crêpe paper 9 are drawn out of the conveying trough 5, 6. Then the surface of the porous mass has formed itself definitely and is nearly entirely flat.

Figure 2A:
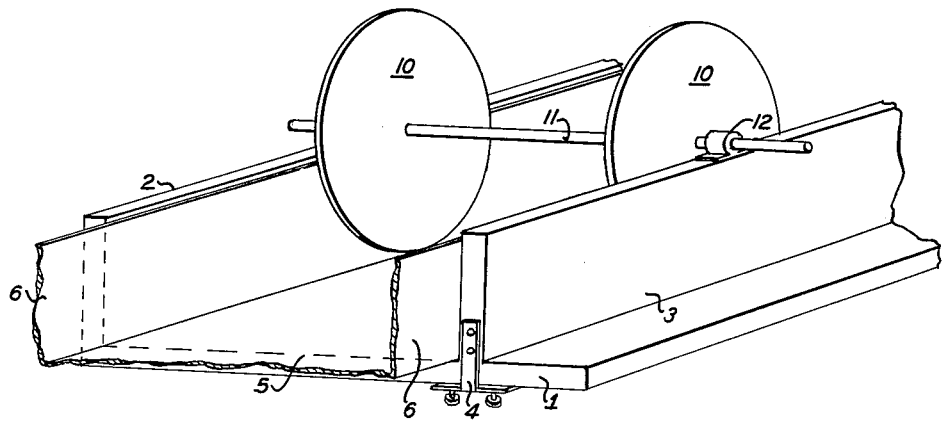
FIGURE 2a is a perspective view of a second embodiment according to the invention.

With the modified embodiment of the device indicated in FIGURE 2a the guiding plates 7 and the strips of crêpe paper 9 are deleted. Discs 10 which are arranged close to the sidewalls 6 of the advancing conveying trough 5, 6 extend nearly to the bottom into the said conveying trough at the place where foaming of the material carried along by the said trough begins. The discs 10 are fixed to a horizontal shaft 11 which is supported in bearings 12 on the upper rim of the stationary sidewalls 2 and 3. The said discs are rotated in a counterclockwise direction by a device not shown in FIGURE 2a, whereby their speed of revolution is chosen in such a manner that at the place where the surface of the foaming mass is in contact with the said discs the speed of the discs corresponds nearly with the speed at which the surface of the mass is moving.

Figure 2B:
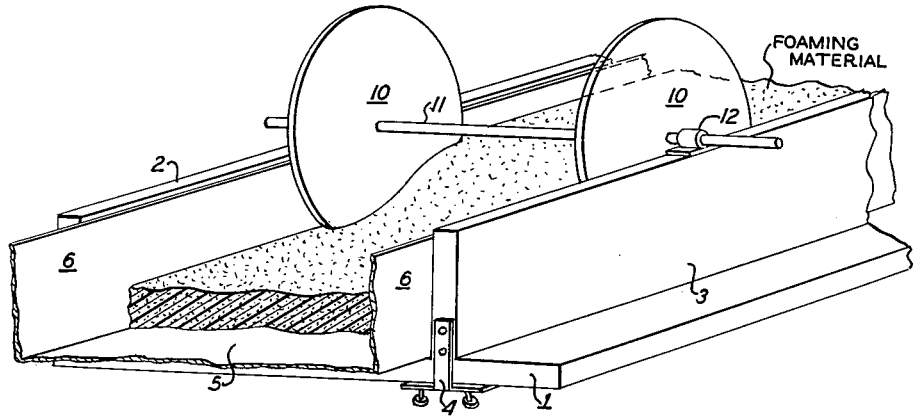

FIG. 2b shows the material conveyed in the trough being operated on by the discs 10.

Several other embodiments of the device according to the invention are still possible which lead to the same purpose. For example, in the embodiment according to FIGURE 1 strips of smooth paper may be used instead of the strips of crêpe paper 9. Two of said strips of smooth paper may then be supplied in directions constituting a sharp angle with the direction of advancement of the strip 5, 6, from the left and from the right side parallel to and below the bottom strip 5, the said smooth strips then constituting an angle at the place of the border between the bottom 1 and each of the sidewalls 2 and 3 and being moved upwardly in a direction constituting a sharp angle with the direction of advancement of the conveying trough 5, 6.

Use could also be made of strips of smooth paper which are introduced from the outside of the sidewalls 2 and 3 through narrow slots near the lower rim of the said sidewalls, the said strips being further directed in the same manner as described in connection with the last named example. Thereby the strips are then guided upwardly outside the sidewalls 6 along the inner walls of the sidewalls 2 and 3 in an oblique forward direction.

What is claimed is:
1. A method of molding a foamable material which foams to form a porous mass, comprising supplying the said material continuously in a substantially horizontally moving trough, moving the lateral limits of the said trough at the place where the free foaming of the said material occurs in a substantially vertical plane so that the horizontal component of said movement has a speed which corresponds substantially with the horizontal speed at which the foaming mass is conveyed, and the vertical component of said movement has a speed which is at least equal to the vertical speed at which the surface of the foaming mass rises.

2. A method of molding a foamable material which foams to form a porous mass, comprising supplying the said material continuously in a substantially horizontally moving trough, moving a part of the lateral limits of the said trough at the place where the free foaming of the said material occurs such that the horizontal component of said movement has a speed which corresponds substantially with the horizontal speed at which the foaming mass is conveyed, and the vertical component of said movement has a speed which is at least equal to the vertical speed at which the surface of the foaming mass rises.

3. A device for molding a foamable material which foams to form a porous mass comprising a horizontal trough adapted to be advanced longitudinally, guiding plates stationarily positioned in the said trough in the region where foaming occurs, close to and parallel to both inner sidewalls of the said trough, strips of flexible material folded around said guiding plates and adapted to be positively driven, said guiding plates having a shape at the place where foaming begins such that the strips of flexible material are moved, after advancement in horizontal direction through a sharp angle to the said direction and the movement of said strips has a component both in the horizontal direction of conveyance of the trough and in the vertical rising direction.

4. A device for molding a foamable material which foams to form a porous mass comprising a horizontal trough adapted to be advanced longitudinally, rotatable discs positioned in the said trough adjacent the place where foaming begins close to and parallel to both inner sidewalls of the said trough, thereby effectively constituting an extension of said sidewalls, said discs being positioned to laterally engage said material, said discs being adapted to be positively driven and to be rotated in such a direction that said discs move said foaming mass both in a horizontal direction and upwardly.

References Cited in the file of this patent

UNITED STATES PATENTS

| | | |
|---|---|---|
| 2,027,165 | Grubman | Jan. 7, 1936 |
| 2,161,308 | Murphy et al. | June 6, 1939 |
| 2,165,280 | Lannan | July 11, 1939 |
| 2,336,944 | Madge | Dec. 14, 1943 |
| 2,525,965 | Smith | Oct. 17, 1950 |
| 2,618,012 | Milne | Nov. 18, 1952 |
| 2,700,177 | Mottet | Jan. 25, 1955 |
| 2,728,941 | Alles et al. | Jan. 3, 1956 |
| 2,740,157 | McCurdy et al. | Apr. 3, 1956 |
| 2,769,205 | Pfleumer | Nov. 6, 1956 |
| 2,774,106 | Bethe | Dec. 18, 1956 |
| 2,857,625 | Carlson | Oct. 28, 1958 |
| 2,923,030 | Himmelheber et al. | Feb. 2, 1960 |

FOREIGN PATENTS

| | | |
|---|---|---|
| 744,165 | Great Britain | Feb. 1, 1956 |